United States Patent Office 2,992,588
Patented July 18, 1961

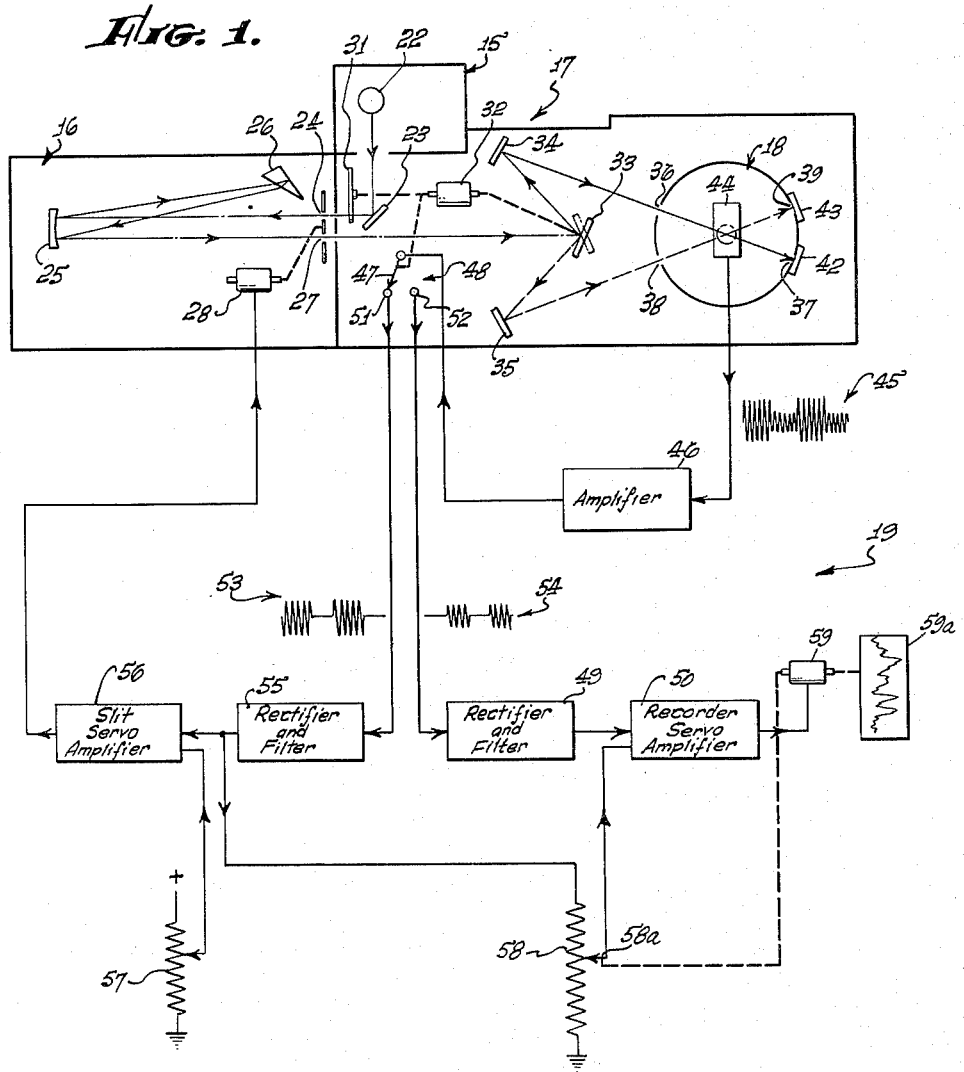

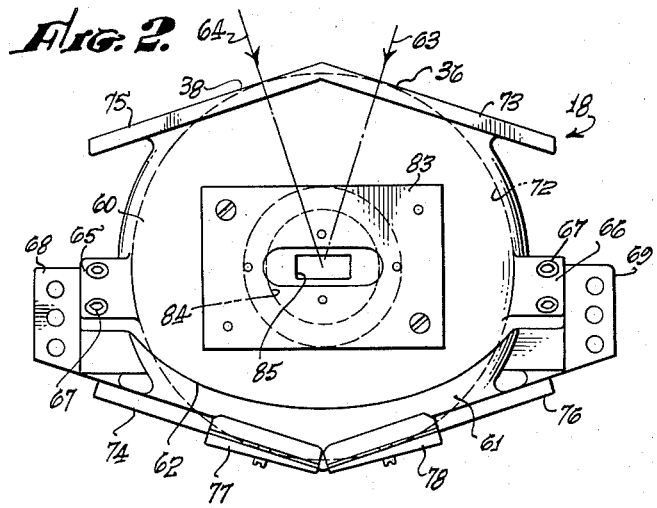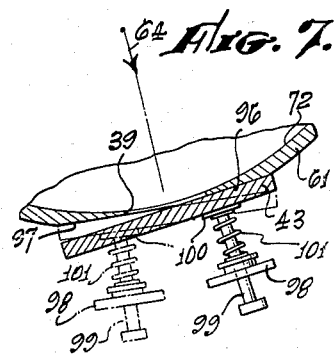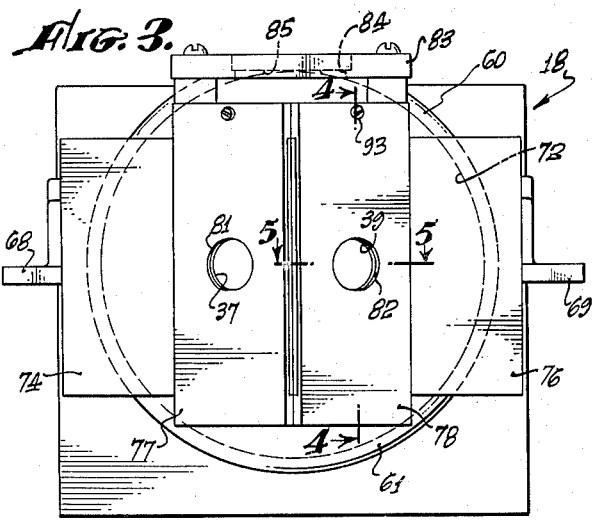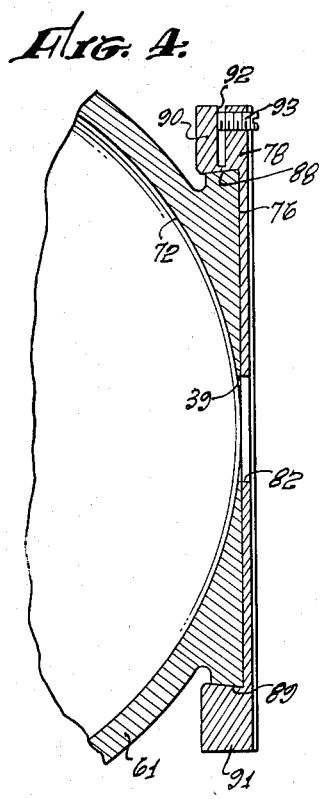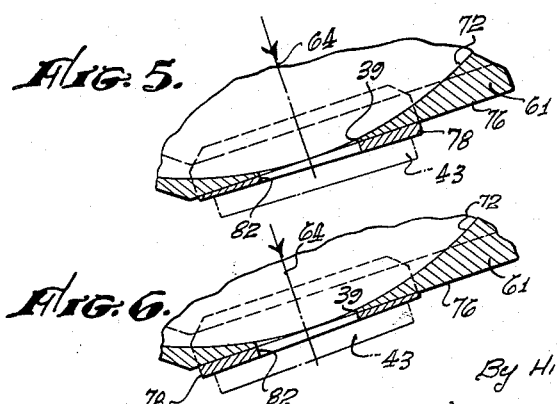
Billie D. Henderson, Inventor.
By his Attorneys,
Harris, Kiech, Foster & Harris.

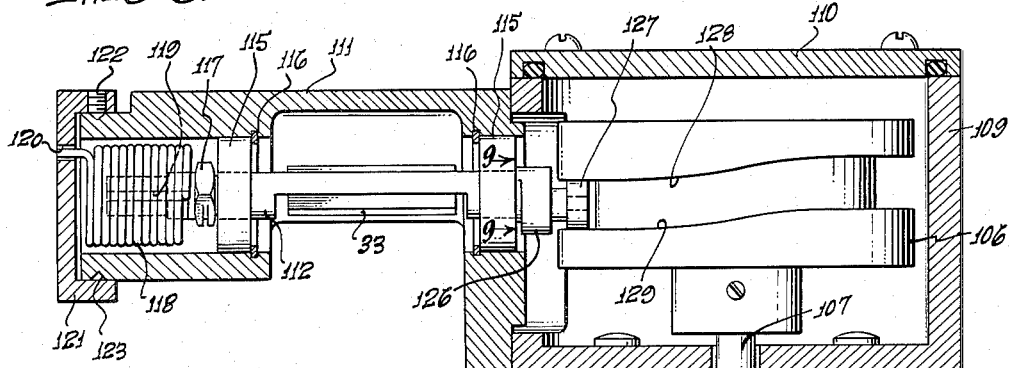
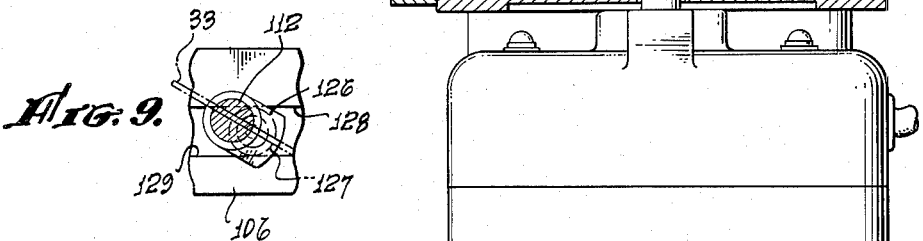
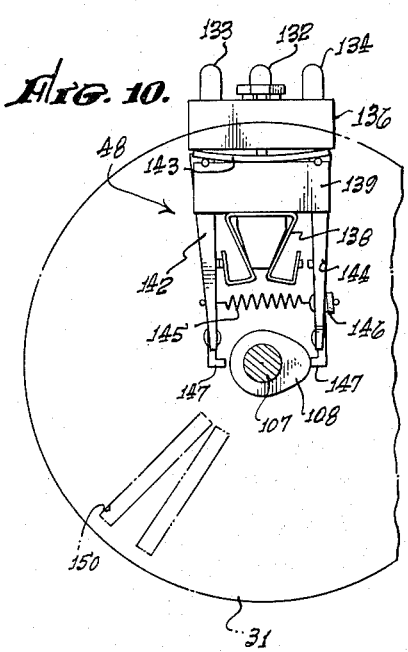
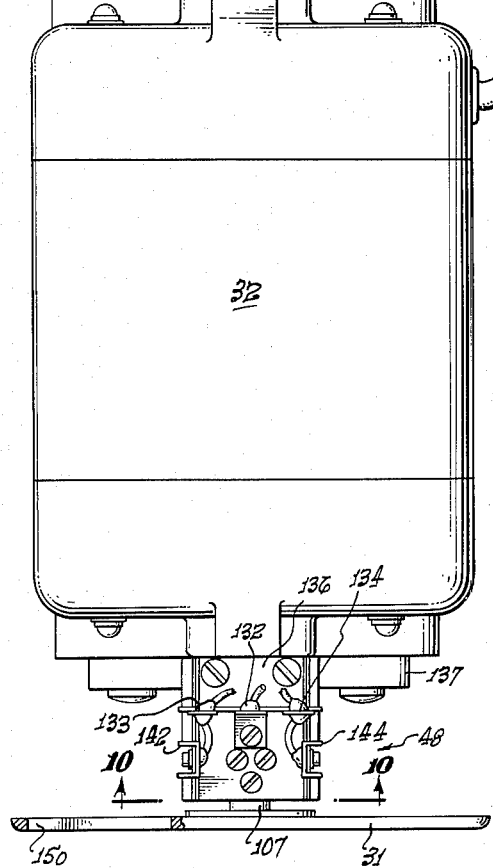

2,992,588
PHOTOMETER REFLECTANCE UNIT
Billie D. Henderson, Fullerton, Calif., assignor to Beckman Instruments, Inc., a corporation of California
Filed Feb. 3, 1958, Ser. No. 713,021
14 Claims. (Cl. 88—14)

This invention relates to spectrophotometers and, in particular, to a spectrophotometer especially suited for reflectance measurements.

It is an object of the invention to provide a reflectance measuring system for a spectrophotometer using an integrating sphere with sample material and reference material mounted thereon in which a minimum number of noncommon optical elements are present in the sample and reference beams. Another object of the invention is to provide such a system using an oscillating reflector or mirror for switching the source beam of radiation alternately towards the sample material and the reference material. A further object is to provide such a system in which the only noncommon elements are the focusing mirrors which focus the switched beams on the sample material and reference material respectively.

It is another object of the invention to provide a spectrophotometer utilizing an oscillating reflector having stationary or dwell periods at each end of its oscillation with periods of rapid movement therebetween. Another object of the invention is to provide such an oscillating reflector in which each dwell period is in the order of one quarter of a cycle of the oscillation. A further object of the invention is to provide such an oscillating reflector which is driven by a rotating cam having opposed flat sections which provide the dwell periods.

It is an object of the invention to provide a spectrophotometer for use in a reflectance measuring system with an oscillating reflector in which the two radiation paths cross within the integrating sphere, preferably at the center of the sphere, providing optimum utilization of space for the instrument. Another object of the invention is to provide an integrating sphere for use in such a system having oppositely disposed entrance and sample ports for each radiation path within the sphere with means for mounting transmittance and reflectance materials at each port.

It is a further object of the invention to provide a spectrophotometer having a detector cell and a comparison circuit using a detector signal switch synchronized with the oscillating reflector for providing a reflectance ratio indication. Another object of the invention is to provide such a system with a single drive in which the oscillating reflector and the detector switch are driven by cams mounted on the same shaft. A further object of the invention is to provide such a system in which the radiation beam is cyclically interrupted at a frequency at least several times greater than that of the oscillating reflector to provide an A.C. signal for the detector. A still further object of the invention is to provide such a system in which the beam interrupter is an apertured plate carried on the same shaft with the two cams.

It is an object of the invention to provide a sphere for use in both diffuse and total reflectance measurements wherein the sample material and reference material mounting surfaces are variable permitting the specular reflection to be directed out of the sphere through an entrance port or against an inner wall of the sphere. A further object of the invention is to provide such a sphere wherein the two paths cross at the center of the sphere and the specular reflections from the two paths may be directed to a single point on the surface of the sphere.

It is another object of the invention to provide a spectrophotometer which can be used with an external source and a detector at the sphere, or with a source at the sphere and an external detector, or with a pair of external sources directed through the sphere to an external detector. A further object of the invention is to provide such a spectrophotometer which can be used for reflectance, fluorescence, and transmittance measurements. Another object of the invention is to provide such a spectrophotometer suitable for use either with or without a monochromator.

The invention also comprises novel details of construction and novel combinations and arrangements of parts, which will more fully appear in the course of the following description. The drawings merely show and the description merely describes preferred embodiments of the invention which are given by way of illustration or example.

In the drawings:

FIG. 1 is a block diagram showing the operation of a preferred embodiment of the present invention;

FIG. 2 is a top view of an integrating sphere of the embodiment of FIG. 1;

FIG. 3 is an end view of the sphere of FIG. 2;

FIG. 4 is an enlarged, partial sectional view taken along the line 4—4 of FIG. 3;

FIG. 5 is an enlarged, partial sectional view taken along the line 5—5 of FIG. 3;

FIG. 6 is a view similar to FIG. 5 showing an alternate position for the mounting wedge;

FIG. 7 is a view similar to FIG. 5 showing an alternative construction;

FIG. 8 is a view, partly in section, showing the synchronous drive mechanism;

FIG. 9 is a partial sectional view taken along the line 9—9 of FIG. 8; and

FIG. 10 is a sectional view taken along the line 10—10 of FIG. 8 with the beam interrupter shown in phantom.

The spectrophotometer of the invention, as shown in FIG. 1, includes a source 15 of a beam of radiation, a monochromator 16, a beam control system 17, and an integrating sphere 18, and a signal comparison circuit 19.

The source of radiation will ordinarily be an incandescent lamp or gas discharge tube 22 but any suitable source may be used. The beam from the source is directed into the monochromator by a reflector or mirror 23. The monochromator may be conventional in construction, with the beam entering at an entrance slit 24, being reflected from a collimating mirror 25 to a prism 26. The dispersed beam is reflected back to the collimating mirror and out through an exit slit 27. A servomotor 28 is mechanically coupled to the slits for controlling the size thereof. The monochromator may be omitted from the system when desired, as when tests are being made with "white" light.

A beam interrupter or chopper is used to interrupt the beam from the source and, as in the embodiment shown herein, may consist of an apertured plate 31 positioned between the reflector 23 and the entrance slit 24, the plate being rotatably driven by a motor 32.

An oscillating reflector or mirror 33 is also driven by the motor 32 moving from the position shown in solid lines to the position shown in dashed lines and return for alternately directing the beam from the monochromator to a focusing mirror 34 and a focusing mirror 35. The focusing mirror 34 directs a beam into the sphere 18 through an entrance port 36 toward a sample port 37 and the focusing mirror 35 directs another beam into the sphere through an entrance port 38 toward a sample port 39, the mirrors focusing a desired diameter of beam at the respective sample ports. A reference material 42 is mounted at the sample port 37 and a sample material 43 is mounted at the sample port 39 for reflecting radiation into the sphere, which radiation is picked up by a detector 44 mounted on the sphere.

The detector 44, which may be a lead sulphide cell or a multiplier phototube or a similar unit, produces an output signal of the form shown at 45, which signal is amplified in an amplifier 46 and directed by a suitably timed switching mechanism alternately into two circuits. In the particular circuitry shown, the amplified signal is directed to a center contact 47 of a switch 48. The contact 47 of the switch 48 is driven by the motor 32 in synchronism with the oscillating reflector 33 to direct the portion of the signal 45 due to the beam reflected from the mirror 34 to a contact 51 and the portion of the signal 45 due to the beam from the mirror 35 to a contact 52, producing a division of the signal 45 as shown at 53, 54. The signal 53 is converted to D.C. in a rectifier and filter 55, the resultant D.C. signal being coupled as an input to a slit servoamplifier 56. A D.C. source is connected across a potentiometer 57 to provide a manually variable reference voltage for the servoamplifier 56. The output of the servoamplifier 56 drives the servomoter 28 which varies the size of the slit of the monochromator to maintain the signal 53 at a constant value determined by the setting of the arm of the potentiometer 57. An alternative method of controlling the slit width is to alter the gain of amplifier 46, the setting of potentiometer 57 being held constant.

The signal 54 is converted to D.C. in a rectifier and filter 49, the output of which is coupled as an input to a recorder servoamplifier 50. The D.C. signal from the rectifier and filter 55 is coupled across the potentiometer 58 to provide a second input for the servoamplifier 50. The output of the amplifier 50 drives a servomotor 59 which in turn drives a recorder 59a and an arm 58a of the potentiometer 58, creating a feedback loop so that the recorded output is a ratio of the signals 53, 54, thus providing a measure of the relative reflectance of the reference material 42 and the sample material 43.

The integrating sphere 18 is an important feature of the spectophotometer of the invention and is shown in greater detail in FIGS. 2 through 7. An upper hemispherical shell 60 and a lower hemispherical shell 61 are joined along a plane 62 which is oblique to radiation paths 63, 64. External lugs 65, 66 on the upper shell 60 and similar lugs on the lower shell 61 permit clamping of the shells by screws 67. External brackets 68, 69 are provided for mounting the sphere in the instrument housing (not shown).

When clamped together, the shells 60, 61 provide a spherical inner surface 72 which is coated with a uniform highly reflective material such as magnesium oxide. Exterior mounting surfaces 73, 74, 75, 76 are provided around the ports 36, 37, 38, 39, respectively. Filters and transmittance samples may be mounted on the surfaces 73 and 75 when desired. Also, for certain applications of the instrument, filters and transmittance samples may be mounted on the surfaces 74 and 76. In the particuular embodiment of the invention illustrated herein, special sample and reference material mounting plates 77, 78 are provided for mounting on the surfaces 74, 76, the reflectance materials being clamped against the plates by suitable means, such as by conventional spring fingers, the plates being provided with openings 81, 82 for alignment with the ports 37, 39.

A plate 83 is mounted on the shell 60 at an aperture 84 in the shell, the plate being adapted to carry the detector 44 and having an opening 85 therein in alignment with the aperture 84 for positioning the detector at the spherical surface 72.

The ports and mounting surfaces may be arranged on the sphere to provide any desired light paths through the sphere. However, it is preferred to have the paths, as indicated by the lines 63, 64, intersect within the sphere, preferably at the center thereof. Such a structure permits the paths 63, 64 to be normal to the inner surface 72 of the sphere, while at the same time permitting the ports to be relatively large and spaced from each other so that the size of sample and reference materials is not unduly restricted as would be the case where parallel paths were used with the paths substantially normal to the inner surface.

The plates 77, 78 are identical and are wedge shaped in cross section, as best seen in FIGS. 5 and 6. The plate 78 is designed so that it may be mounted on the surface 76 as shown in FIG. 5 and also may be inverted or rotated 180° to the position shown in FIG. 6. The mounting surfaces 73 and 75 are preferably perpendicular to the paths 63, 64, respectively. However, the mounting surfaces 74 and 76 are preferably disposed a few degrees from the perpendicular to the paths. The surface 76 and the plate 78 will be discussed in detail herein, the same discussion also applying to the surface 74 and the plate 77. Referring to FIGS. 5 and 6, the surface 76 is plane, perpendicular to the paper, and rotated B degrees clockwise from perpendicular to the path 64, B being a few degrees. For example, in one embodiment of the invention, B it two degrees. The angle of intersection between the two planes of the wedge shaped plate 78 is also B degrees. When the plate 78 is oriented as shown in FIG. 6, the exterior surface thereof against which the sample material 43 is placed, is perpendicular to the path 64 so that the specular reflection is directed out from the sphere through the opposite entrance port 38 providing a reading of diffuse reflection only. When the plate is inverted to the position shown in FIG. 5, the exterior surface thereof is no longer perpendicular to the path 64, resulting in the specular reflection being directed against the interior surface of the sphere providing a reading of total reflection.

In operating the sphere for total reflectance measurement, it is preferred to have both the reference and sample specular reflections directed to the same point on the inner surface of the sphere providing maximum accuracy in the reflectance ratio measurement. This is accomplished by having the angle B equal to one-sixteenth the angle betwen the intersecting paths 63, 64 when they intersect at the center of the sphere.

The mounting surface 76 may be provided with upper and lower tapered surfaces 8, 89 (FIG. 4). The plate 78 is provided with enlarged upper and lower ends 90, 91, having tapered surfaces which mate with the surfaces 88, 89, respectively, permitting the plate to be slid horizontally onto the mounting surface. A slot 92 and set screw 93 in the end 90 provide adjustment of the taper angle eliminating play in the fit. The plate is then changed from the position shown in FIGS. 4 and 5 to the position shown in FIG. 6 by sliding the plate to the right, as seen in FIG. 3, to remove the plate from the surface 76, then inverting the plate and replacing it by sliding it to the left on the surface 76.

An alternative construction providing for shifting between diffuse and total reflection measurements is shown in FIG. 7. Two plane surfaces 96, 97 are formed on the exterior of the shell 61 adjacent the port 39. One of the surfaces, say the surface 96, is perpendicular to the path 64 and the other surface 97 is oblique to the path a few degrees. For diffuse reflection measurements, the sample material 43 is clamped against the surface 96, as shown in solid lines in FIG. 7, thereby directing the specular reflection back along the path 64. For total reflection measurements, the sample is clamped against the surface 97, as shown in phantom lines in FIG. 7, thereby directing a specular reflection against the inner surface of the sphere.

The clamp of FIG. 7 may also be used with the structure of FIGS. 2 through 6. The clamp includes an upstanding member 98 which is carried on the housing of the instrument and a pin 99 slidingly positioned in the member 98. A sample engaging plate 100 is carried at one end of the pin 99 and a coil spring 101 positioned around the pin urges the plate 100 away from the member 98 and into engagement with the sample 43.

The unitary drive for the oscillating reflector 33 and the switch 48 as well as the apertured plate or chopper 31 is another important feature of the spectrophotometer of the invention. A preferred form for this drive is shown in FIGS. 8 through 10, wherein the motor 32 has an oscillating cam 106 mounted at one end of the motor shaft 107 and a switching cam 108 and the apertured plate 31 mounted at the other end of the shaft 107. A cam housing 109 having a cover 110 is mounted on one end of the motor with the cam 106 positioned therein. A mirror bracket 111 is mounted on the housing 109 with a mirror shaft 112 mounted in the bracket for pivotal movement about an axis perpendicular to the axis of the shaft 107. The mirror shaft 112 is mounted in bearings 115 which in turn are held in place by snap rings 116, the mirror 33 being mounted on the shaft 112. The shaft is axially positioned by a lock nut 117 mounted on a threaded portion of the shaft.

A coil spring 118 is positioned about the upper end of the mirror shaft 112 with one end of the spring disposed in a slot 119 in the shaft and the other end positioned in an opening 120 in a cap 121, the cap being rotatably mounted on the bracket 111 by a set screw 122 which engages a peripheral groove 123 in the bracket. The coil spring 118 urges the mirror shaft in rotation in one direction and the rotatable cap 121 permits adjustment of the spring tension. An offset or lever 126 is formed at the other end of the mirror shaft with a cam follower or roller 127 mounted thereon, the axis of rotation of the roller being parallel to and displaced from the axis of rotation of the mirror shaft. The roller 127 is positioned between spaced cam surfaces 128, 129 of the cam 106, the spring 118 urging the roller into engagement with one of the surfaces while the other surface prevents backlash or bounce in the system.

As the motor shaft 107 and the cam 106 rotate, the mirror shaft 112 and mirror 33 are oscillated in synchronism therewith, the mirror moving from the position shown in FIG. 8 and in solid lines in FIG. 1 to the position shown in dashed lines in FIG. 1 and return. It is preferred to have the mirror come to a complete stop at each extreme of the oscillation cycle to obtain an increase in the radiant energy directed into the sphere. This may be obtained by providing flat portions on the cam surfaces 128, 129 at the zones corresponding to the extremes of oscillation. In the preferred form of the embodiment shown herein, each of these flat portions or dwell periods constitute about 90° of the cam or about one-fourth of the oscillation cycle, which provides an optimum performance for the reflectance measuring system.

The switch 48 has an input terminal 132 and output terminals 133, 134. These terminals are mounted on an insulating block 136 which is carried on a plate 137 fixed to the end of the motor opposite the cam housing 109. The input terminal 132 is electrically connected to a contact strip 138 which is carried on an insulating block 139 fixed to the block 136. Terminal 133 is electrically connected to a rocker arm 142 which is pivotally mounted between blocks 136 and 139, a spring plate 143 being positioned between the blocks to maintain the rocker arm in position. Terminal 134 is connected to a similar rocker arm 144. A tension spring 145 is positioned between the arms 142, 144, urging each arm toward the contact strip 138, with an insulator button 146 providing electrical insulation at one end of the spring. Each arm is provided with a cam follower 147 for engaging the cam 108 so that each rocker arm is alternately moved out of engagement with the contact strip providing the signal switching function described in conjunction with FIG. 1.

The plate 31 is provided with a plurality of equally spaced radially disposed slots 150 for interrupting the light beam between the source and the oscillating mirror to provide an A.C. signal for the detector circuit. The beam interruption frequency should be at least several times that of the mirror oscillation frequency so that several cycles of radiation will be directed into the sphere during each dwell period of the mirror. When certain types of lead sulfide cells are used as detectors, the beam frequency should be considerably greater than the oscillation frequency and in the particular embodiment shown herein, the plate 31 is provided with thirty two apertures 150, the motor 32 having a fifteen revolution per minute output giving a 480 cycle per minute beam frequency.

The spectrophotometer of the invention provides a reflectance measuring system in which the beam encounters only one noncommon element in the reference and sample measuring intervals, namely, the focusing mirrors 34, 35. The beam switching accomplished by the oscillating mirror and the signal switching arm are maintained in phase and in synchronism by the unitary drive motor. This system provides the desired improvements in stability, accuracy, and ease of operation which were not obtainable with the previously known instruments.

It should be noted that this same apparatus can be used for direct sphere illumination measurements by beaming the light into the sphere through the opening 84 where the detector is ordinarily positioned and by substituting a detector for the source 15. This method of illuminating the sample and reference materials is well suited to the analysis of products which fluoresce, the detector responding to a given wavelength only in the reflected light and fluorescent light from the reference and sample materials.

The apparatus of the invention is also suited for use in comparing two sources. A detector is substituted for the source 15 and the sample ports 37, 39 are left open. The radiation from the sources being compared is directed into the sphere through the sample ports, out through the entrance ports to the focusing mirrors, the beams following the reverse of the normal path shown in FIG. 1.

Although exemplary embodiments of the invention have been disclosed and discussed, it will be understood that other applications of the invention are possible and that the embodiments disclosed may be subjected to various changes, modifications and substitutions without necessarily departing from the spirit of the invention.

I claim as my invention:

1. In a reflectance measuring system, the combination of: a source of a beam of radiation; an integrating sphere having a first set of entrance and sample ports defining a sample path within said sphere and a second set of entrance and sample ports defining a reference path within said sphere, with said sample and reference paths intersecting at an acute angle within said sphere; and means for directing said radiation from said source alternately through each of said entrance ports along each of said paths, said means including an oscillating reflector with said beam of radiation from said source being directed to said oscillating reflector for reflection therefrom into said sphere alternatingly along said sample path and said reference path.

2. In a reflectance measuring system, the combination of: a source of a beam of radiation; an integrating sphere having a first set of entrance and sample ports defining a sample path within said sphere and a second set of entrance and sample ports defining a reference path in said sphere, with said sample and reference paths intersecting substantially at the center of said sphere, and having exterior mounting surfaces about each of said entrance ports, with each of said mounting surfaces substantially tangent to the interior surface of said sphere; and means for directing said radiation from said source alternately through each of said entrance ports along each of said paths, said means including an oscillating reflector and a pair of fixed reflectors, with a fixed reflector aligned with each of said paths, and with said beam of radiation from said source being directed to said oscillating reflector for alternate reflection therefrom to each of said fixed reflectors and corresponding entrance ports.

3. In a reflectance measuring system, the combination of: a source of a beam of radiation; an integrating sphere having a first set of entrance and sample ports defining a sample path within said sphere and a second set of entrance and sample ports defining a reference path within said sphere; means for directing said radiation from said source alternately through each of said entrance ports along each of said paths, said means including an oscillating reflector, a drive for cyclically oscillating said reflector between two positions, and position control means for coupling said drive to said reflector for maintaining the reflector stationary for an interval of time at each of said positions; and means for directing said source to said oscillating reflector along a single path for alternate reflection during said dwell periods to each of said entrance ports along two similar paths.

4. In a reflectance measuring system, the combination of: a source of a beam of radiation; an integrating sphere having a first set of entrance and sample ports defining a sample path within said sphere and a second set of entrance and sample ports defining a reference path within said sphere; a reflector mounted for oscillating movement; a continuously running drive motor; cam means for coupling said drive motor to said reflector for cyclically oscillating said reflector, said cam means providing substantially one quarter cycle of no movement of said reflector at each extreme of the oscillation cycle; and means for directing said radiation from said source to said oscillating reflector along a single path for alternate reflection when said reflector is stationary to each of said entrance ports along two similar paths.

5. In a reflectance measuring system, the combination of: a source of a beam of radiation; an integrating sphere having a first set of entrance and sample ports defining a sample path within said sphere and a second set of entrance and sample ports defining a reference path within said sphere; a reflector mounted for oscillating movement about a first axis; a continuously running drive motor; a cam mounted for rotation about a second axis perpendicular to said first axis and coupled to said drive motor; said cam including a pair of uniformly spaced peripheral cam surfaces providing angularly displaced flat zones of equal duration; a cam follower disposed between said cam surfaces, said cam follower being carried on a lever fixed to said reflector for oscillating said reflector as said cam rotates; and means for directing said radiation from said source to said oscillating reflector along a single path for alternate reflection when said reflector is stationary to each of said entrance ports along two similar paths.

6. In a reflectance measuring system, the combination of: a source of a beam of radiation; an integrating sphere having a first set of entrance and sample ports defining a first path within said sphere and a second set of entrance and sample ports defining a second path within said sphere, said sphere including exterior sample mounting surfaces at said sample ports; means for directing said radiation from said source alternately through each of said entrance ports along each of said paths, said means including an oscillating reflector with said beam of radiation being directed from said source to said oscillating reflector along a single path and from said oscillating reflector to said sphere along two similar paths; and means for mounting a reflector at each of said sample mounting surfaces in one of two possible positions, with the reflector perpendicular to the path through the corresponding port in the first of said positions for directing specular reflection along said path, and with the reflector oblique to said path in the second of said positions for directing specular reflection against an interior wall of said sphere.

7. In a reflectance measuring system, the combination of: a source of a beam or radiation; an integrating sphere having a first set of entrance and sample ports defining a first path within said sphere and a second set of entrance and sample ports defining a second path within said sphere, said sphere including exterior sample mounting surfaces at said sample ports, each of said surfaces being plane and disposed at an angle B to a plane perpendicular to the path passing through the corresponding port; means for directing said radiation from said source alternately through each of said entrance ports along each of said paths, said means including an oscillating reflector with said beam of radiation being directed from said source to said oscillating reflector along a single path and from said oscillating reflector to said sphere along two similar paths; and a pair of apertured sample spacing plates, each plate being mounted on said sphere at a sample mounting surface with its aperture aligned with the corresponding sample port, each of said plates having opposed flat surfaces the planes of which converge at said angle B, each of said plates being rotatable 180° relative to the sphere about an axis perpendicular to the corresponding mounting surface.

8. In a reflectance measuring system, the combination of: a source of a beam of radiation; an integrating sphere having a first set of entrance and sample ports defining a first path within said sphere and a second set of entrance and sample ports defining a second path within said sphere, with said first and second paths intersecting at substantially the center of said sphere at an angle A, said sphere including exterior sample mounting surfaces at said sample ports, each of said surfaces being plane and disposed at an angle B, to a plane perpendicular to the path passing through the corresponding port, with A equal to substantially 16B; means for directing said radiation from said source alternately through each of said entrance ports along each of said paths, said means including an oscillating reflector with said beam of radiation being directed from said source to said oscillating reflector along a single path and from said oscillating reflector to said sphere along two similar paths; and a pair of apertured sample spacing plates, each plate being mounted on said sphere at a sample mounting surface with its aperture aligned with the corresponding sample port, each of said plates having opposed flat surfaces the plane of which converge at said angle B, each of said plates being rotatable 180° relative to the sphere about an axis perpendicular to the corresponding mounting surface.

9. In a reflectance measuring system, the combination of: a source of a beam of radiation; an integrating sphere having a first set of entrance and sample ports defining a first path within said sphere and a second set of entrance and sample ports defining a second path within said sphere, said sphere including exterior sample mounting surfaces at said sample ports, each of said surfaces comprising two planes intersecting along a line which transverses the corresponding port; means for directing said radiation from said source alternately through each of said entrance ports along each of said paths, said means including an oscillating reflector with said beam of radiation being directed from said source to said oscillating reflector along a single path and from said oscillating reflector to said sphere along two similar paths; and a pair of sample clamping means for clamping a reflector against said mounting surface at each of said sample ports, each of said clamping means being movable from a first position to a second position for selectively clamping the reflector against either one of the intersecting planes comprising the mounting surface.

10. In a reflectance measuring system, the combination of: a source of a beam of radiation, said source including a monochromator exit slit; an integrating sphere having first and second radiation transmission paths therethrough with said paths intersecting within said sphere;

a detector mounted on said sphere for providing a signal as a function of the radiation within said sphere; an oscillating reflector for directing said radiation of said source alternately along each of said paths; a pair of fixed concave mirrors, with a mirror positioned in each path between the oscillating reflector and the entrance port for focusing the exit slit image at the sample port; a switch having an input and two outputs, said detector signal being coupled to said input; a signal comparison circuit having two inputs and providing an output which is a function of the ratio of the signals at its inputs, said outputs of said switch being coupled to said inputs of said circuit; and a drive motor carrying first cam means for oscillating said reflector, second cam means for oscillating said switch in synchronism with said reflector, and a radiation beam chopper positioned ahead of said reflector for interrupting said beam directed to said reflector at a frequency at least several times the frequency of oscillation of said reflector, said first cam means driving said reflector between two positions corresponding to said two paths with a dwell period at each of said positions, said switch coupling said detector signal to one comparison circuit input when said radiation is directed along one path and to the other comparison circuit input when said radiation is directed along the other path.

11. In a reflectance measuring system, the combination of: a source of a beam of radiation; an integrating sphere having a first set of entrance and sample ports defining a sample path within said sphere and a second set of entrance and sample ports defining a reference path within said sphere with said sample and reference paths intersecting at the approximate center of said sphere; a reflector mounted for oscillating movement; a continuously running drive motor; cam means for coupling said drive motor to said reflector for cyclically oscillating said reflector, said cam means providing substantially one quarter cycle of no movement of said reflector at each extreme of the oscillation cycle; and means for directing said radiation from said source to said oscillating reflector along a single path for alternate reflection when said reflector is stationary to each of said entrance ports along two similar paths.

12. In a reflectance measuring system, the combination of: a source of a beam of radiation; an integrating sphere having a first set of entrance and sample ports defining a first path within said sphere and a second set of entrance and sample ports defining a second path within said sphere with said first and second paths intersecting at the approximate center of said sphere, said sphere including exterior sample mounting surfaces at said sample ports; means for directing said radiation from said source alternately through each of said entrance ports along each of said paths, said means including an oscillating reflector with said beam of radiation being directed from said source to said oscillating reflector along a single path and from said oscillating reflector to said sphere along two similar paths; and means for mounting a reflector at each of said sample mounting surfaces in one of two possible positions, with the reflector perpendicular to the path through the corresponding port in the first of said positions for directing specular reflection along said path, and with the reflector oblique to said path in the second of said positions for directing specular reflection against an interior wall of said sphere.

13. In a reflectance measuring system, the combination of: a source of a beam of radiation; an integrating sphere having first and second radiation transmission paths therethrough; a detector mounted on said sphere for producing a signal as a function of the radiation within said sphere; an oscillating reflector for directing said radiation of said source alternately along each of said paths; a switch having an input and two outputs, said detector signal being coupled to said input; a signal comparison circuit having two inputs and providing an output which is a function of the ratio of the signals at its inputs, said outputs of said switch being coupled to said inputs of said circuit; a rotary drive motor; first rotating cam means carried by said motor and engaging said reflector for oscillating said reflector; and second rotating cam means carried by said motor and engaging said switch for oscillating said switch in synchronism with said reflector, with said switch coupling said detector signal to one comparison circuit input when said radiation is directed along one path and to the other comparison circuit input when said radiation is directed along the other path.

14. In a reflectance measuring system, the combination of: a source of a beam of radiation; an integrating sphere having first and second radiation transmission paths therethrough; a detector mounted on said sphere for producing a signal as a function of the radiation within said sphere; an oscillating reflector for directing said radiation of said source alternately along each of said paths; a switch having an input and two outputs, said detector signal being coupled to said input; a signal comparison circuit having two inputs and providing an output which is a function of the ratio of the signals at its inputs, said outputs of said switch being coupled to said inputs of said circuit; a rotary drive motor; first rotating cam means carried by said motor and engaging said reflector for oscillating said reflector; second rotating cam means carried by said motor and engaging said switch for oscillating said switch in synchronism with said reflector; and a rotating radiation beam chopper carried by said motor and positioned between said source and said reflector for interrupting said beam at a frequency at least several times the frequency of oscillation of said reflector, with said switch coupling said detector signal to one comparison circuit input when said radiation is directed along one path and to the other comparison circuit input when said radiation is directed along the other path.

References Cited in the file of this patent

UNITED STATES PATENTS

| | | |
|---|---|---|
| 1,979,952 | Benford | Nov. 6, 1934 |
| 2,347,067 | Shurcliff | Apr. 18, 1944 |
| 2,383,075 | Pineo | Aug. 21, 1945 |
| 2,435,176 | Buc et al. | Jan. 27, 1948 |
| 2,525,445 | Canada | Oct. 10, 1950 |
| 2,605,671 | Canada | Aug. 5, 1952 |
| 2,613,572 | Mathieu | Oct. 14, 1952 |

FOREIGN PATENTS

| | | |
|---|---|---|
| 732,719 | Great Britain | June 29, 1955 |

UNITED STATES PATENT OFFICE
CERTIFICATE OF CORRECTION

Patent No. 2,992,588                          July 18, 1961

Billie D. Henderson

It is hereby certified that error appears in the above numbered patent requiring correction and that the said Letters Patent should read as corrected below.

Column 3, line 22, for "servomoter" read -- servomotor --; line 40, for "spectophotometer" read -- spectrophotometer --; column 4, line 22, for "it" read -- is --; line 44, for "8" read -- 88 --; column 8, line 4, for "or" read -- of --.

Signed and sealed this 28th day of November 1961.

(SEAL)
Attest:

ERNEST W. SWIDER                          DAVID L. LADD
Attesting Officer                              Commissioner of Patents
                                                                                    USCOMM-DC